United States Patent [19]
Hanser

[11] 3,791,264
[45] Feb. 12, 1974

[54] POWER TRANSMISSION DEVICE FOR ROTATING A GRADER CIRCLE

[75] Inventor: Paul Edmund Hanser, Moline, Ill.

[73] Assignee: Deere & Company, Moline, Ill.

[22] Filed: Apr. 26, 1972

[21] Appl. No.: 247,661

Related U.S. Application Data

[63] Continuation of Ser. No. 20,726, March 18, 1970, abandoned.

[52] U.S. Cl............... 91/176, 91/210, 91/268, 91/271
[51] Int. Cl........................ F01l 15/16, F01b 15/04
[58] Field of Search..... 91/210, 211, 212, 213, 214, 91/176, 454, 457, 271, 268

[56] References Cited
UNITED STATES PATENTS

| | | | |
|---|---|---|---|
| 324,098 | 8/1885 | Elder | 91/176 |
| 721,932 | 3/1903 | Barrow | 91/213 |
| 782,801 | 2/1905 | Uhlenkott | 91/213 |
| 1,645,761 | 10/1927 | Le Duc | 91/210 |
| 1,878,822 | 9/1932 | Dewandre | 91/454 |
| 2,672,731 | 3/1954 | Ashton | 91/454 |
| 2,811,139 | 10/1957 | Lado | 91/210 |

*Primary Examiner*—Paul E. Maslousky

[57] ABSTRACT

A grader circle has an annular internal gear which is meshed with a gear carried at the bottom of a crank shaft. A pair of double-acting hydraulic actuators have their piston rods connected to the crank pin of the crank shaft and the circle is driven by alternate extensions and retractions of the piston rods. The cylinders of the actuators are swively connected to the circle-carrying frame by means of pin structures which are fixed to and swivel with the cylinders as the piston rods are extended and retracted. The pin structures terminate in cams which engage shiftable valve stems of a reversing valve to automatically reverse the flow of fluid to the actuators when the piston rods of the actuators reach the ends of their strokes.

7 Claims, 4 Drawing Figures

PATENTED FEB 12 1974 3,791,264

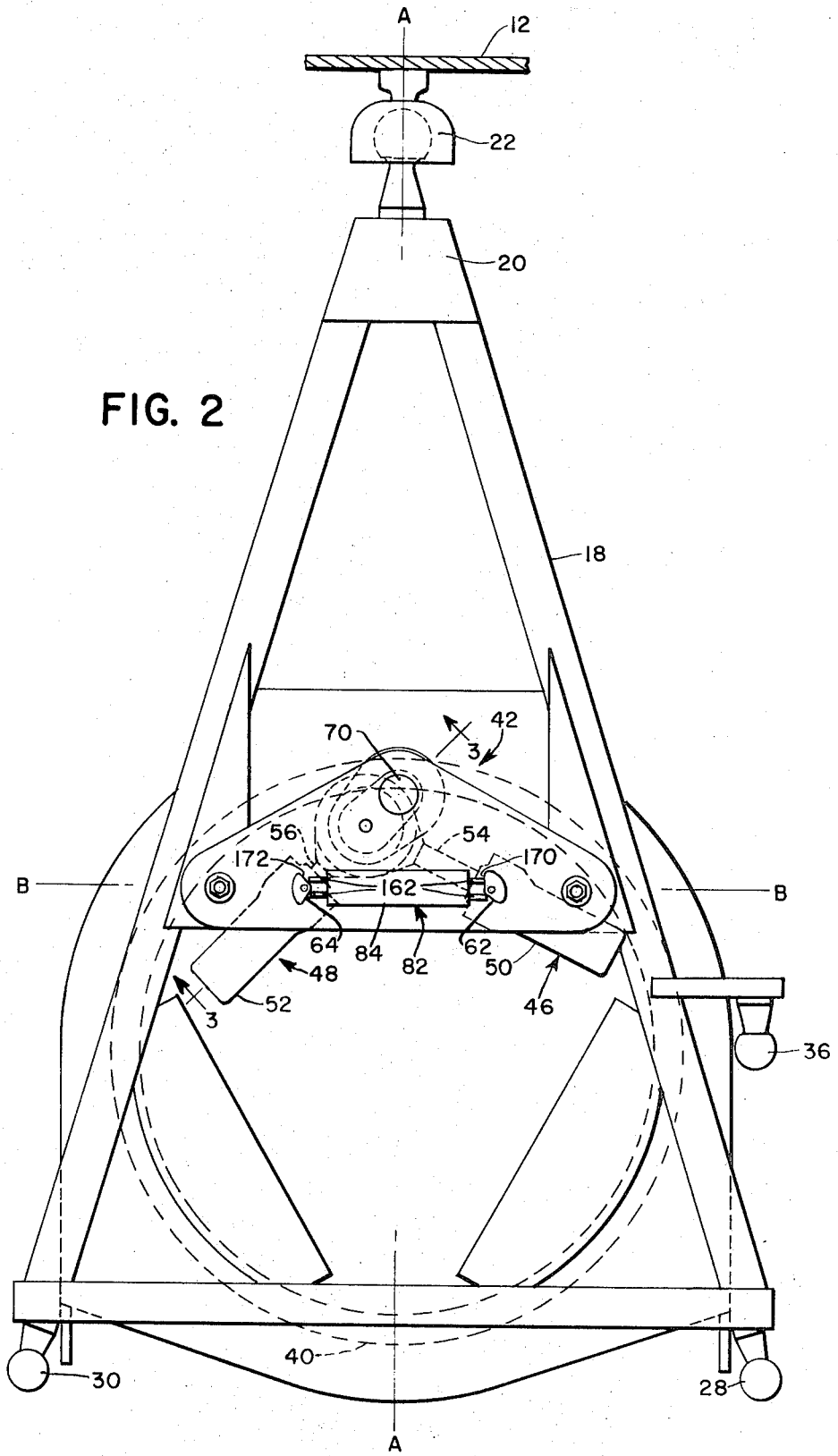

POWER TRANSMISSION DEVICE FOR ROTATING A GRADER CIRCLE

CROSS REFERENCE TO RELATED APPLICATION

This is a continuation of U. S. application Ser. No. 20,726 filed Mar. 18, 1970.

BACKGROUND OF THE INVENTION

This invention relates to a power transmission device for rotating a grader circle and more particularly relates to a power transmission device that includes a crank shaft rotatably driven by alternate extension and retraction of the piston rods of a pair of double-acting hydraulic actuators and a reversing valve that is automatically actuated to reverse the flow of fluid to the actuators when the piston rods are at the ends of their strokes.

Such power transmission devices are generally known and one is illustrated in U. S. Pat. No. 2,811,139 issued to Lado on Oct. 29, 1951. These prior art devices have the disadvantages of lacking the compactness desired for general application and of being relatively difficult and/or expensive to manufacture.

SUMMARY OF THE INVENTION

According to the present invention, there is provided a power transmission device for rotatably driving a grader circle and more particularly there is provided a device which includes a pair of double-acting hydraulic actuators and a reversing valve automatically actuated for reversing the flow of fluid to the actuators when the actuators are at the ends of their strokes.

An object of the invention is to provide a circle drive that is compact.

A more specific object is to provide a reversing valve that is reliable and easy to manufacture.

Still a more specific object is to swivelly mount the actuators on pin structures and to provide cams on the pin structures for actuating the reversing valve as the actuators swivel between positions corresponding to positions wherein the piston rods are at the ends of their strokes.

These and other objects will become apparent from the appended drawings and ensuing description.

BRIEF DESCRIPTION OF THE DRAWINGS

FIG. 2 is an enlarged plan view of the power transmission device, the circle and the circle supporting structure shown in FIG. 1.

DESCRIPTION OF THE PREFERRED EMBODIMENT

Figure 1:
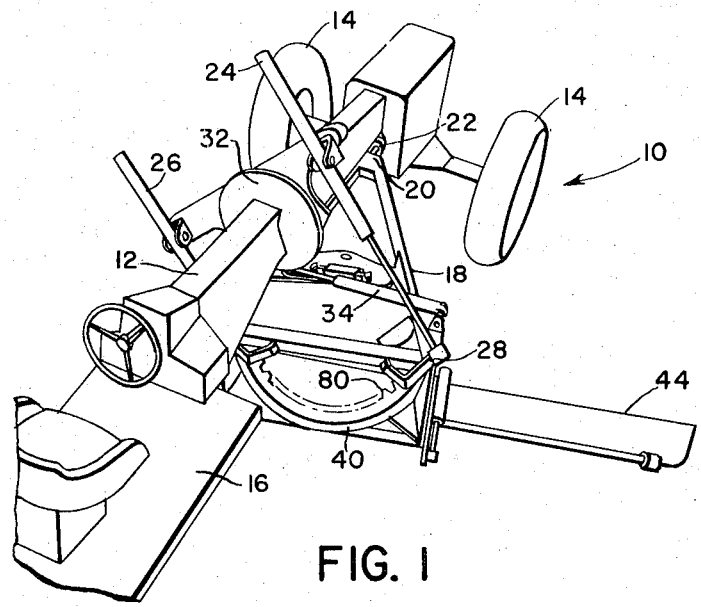
FIG. 1 is a perspective view of the front end portion of a motor grader in which a power transmission device constructed according to the above-mentioned principles is embodied for driving the circle of the grader.
Figure 3:
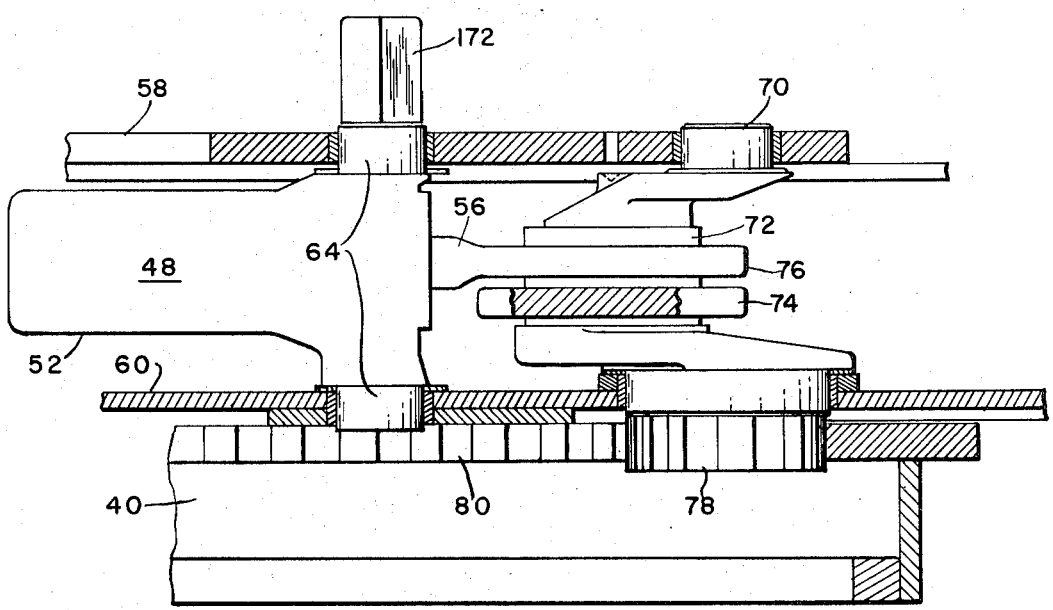
FIG. 3 is a sectional view taken along line 3—3 of FIG. 2 but showing the reversing valve removed.

Referring now to FIG. 1, there is illustrated a motor grader 10 of which only the forward portion is shown. It is to be understood that the rearward portion of the grader 10 is conventional in that it includes the motor and drive wheels of the grader. The grader 10 includes an arched frame 12 supported at its front by a pair of wheels 14 and supported at its rear by the rearward portion of the grader (not shown). An operator's station 16 is mounted on the rear portion of the frame 12 and located thereat are appropriate controls (not shown) for the grader 10. It is here noted that all directions, for example, right and left and counterclockwise and clockwise are made according to the view of a forwardly facing operator at the station 16.

A triangular drawbar 18 is generally symmetrical with respect to an axis A—A along a line bisecting a forward corner 20. The forward corner 20 is connected by means of a ball and socket joint 22 to the forward underside of the frame 12 and a pair of hydraulic actuators 24 and 26 are respectively connected between right and left rear corners 28 and 30 of the drawbar 18 and right and left sides of a rotatable saddle structure 32 carried by the frame 12. The actuators 24 and 26 are extensible and retractable for adjusting the drawbar 18 angularly about the ball and socket joint 22. A third hydraulic actuator 34 is connected between the frame 12 and a ball 36 on the right side of the drawbar 18 and is extensible and retractable for shifting the drawbar sideways on the joint 22.

A circle 40 is rotatably supported, in a manner well known in the art, from the underside of the drawbar 18 and a power transmission device 42 is provided for rotatably driving the circle 40 relative to the drawbar 18 to adjust the working angle of a blade 44 that is fixed to the circle 40.

It is to be understood that the application of the power transmission device 42 as a means for rotating the grader circle 40 is only a representative use and that the device 42 may be used wherever a rotatable output is desired.

The power transmission device 42 includes right and left double-acting hydraulic actuators 46 and 48, respectively. The actuators 46 and 48 include respective cylinders 50 and 52 and piston rods 54 and 56.

Fixed to the upper and lower surfaces of the drawbar 18 are a pair of vertically spaced, transversely extending, horizontal plates 58 and 60, respectively. The actuators 46 and 48 are mounted between the plates at transversely-spaced positions on the opposite sides of the line A—A by vertically extending mounting pin structures 62 and 64. The mounting pin structures 62 and 64 are fixedly secured to the forward ends of the cylinders 50 and 52, respectively, and are journaled at their tops and bottoms for swivelling movement in the plates 58 and 60. A crank shaft 70 is located on the line A—A forwardly of the mounting pin structures 62 and 64 and is also journaled for rotation in the plates 58 and 60. The piston rods 54 and 56 are vertically spaced from each other and the crank shaft 70 has a centrally located crank pin 72 to which is journaled bearing members 74 and 76 fixed to the ends of the piston rods 54 and 56. A gear 78 is fixed at the bottom of the crank shaft 70 and is meshed with an internal annular gear 80 carried by the circle 40. Thus, it can be seen that clockwise rotation of the crank shaft 70 will drive the circle clockwise and that counterclockwise rotation of the crank shaft 70 will drive the circle counterclockwise.

When the actuators 46 and 48 are respectively in either their fully extended or fully retracted positions, the crank pin 72 will be at one of its pair of on-center positions relative to each actuator. The strokes of the piston rods 54 and 56 are 90° out of phase so that when the crank pin 72 reaches an on-center position relative to one actuator, the other actuator will drive the crank pin over center thereby ensuring that subsequent extension or retraction of the one actuator will be effective to drive the crank shaft 70 in the desired direction of rotation. It will be appreciated that except for the momentary periods that the crank pin 72 is at an on-center position, the driving force of both of the actuators 46 and 48 is used to rotate the circle 40.

The direction of fluid flow to and from the actuators 46 and 48, hence, the extension and retraction of the piston rods 54 and 56, is controlled by a reversing valve 82. The reversing valve 82 includes an elongated generally rectangular valve body 84 which is moutned on the upper plate 58 between and centered with respect to the upper ends of the mounting pin structures 62 and 64 and is disposed half on one side and half on the other side of a line B—B extending through the rotational centers of the pin structures 62 and 64. First and second pairs of upper and lower vertically disposed valve bores 86, 88 and 90, 92, respectively, extend lengthwise through the forward and rearward halves of the valve body 84. For convenience and clarity, the first pair of upper and lower valve body 86 and 88 are respectively shown at the top and bottom of FIG. 4 in a plane common with the second pair of upper and lower valve bores 90 and 92.

The upper bores 86 and 90 and the lower bores 88 and 92 are respectively interconnected medially their ends by fluid passages 94 and 96. Also, medially of the ends of the bores 86 and 88 are respectively an inlet port 98 and a return port 100. A conduit 102 conveys fluid from a source of fluid pressure, shown as a pump 104, to the inlet port 98 and a conduit 106 connects the return port 100 to a reservoir 108. A direction control valve 110 is connected in the conduits 102 and 106 and is shiftable from a central neutral position wherein fluid flow is blocked to and from the reversing valve 82, to a first active position wherein the inlet and outlet ports 98 and 100 are respectively connected to the pump 104 and reservoir 106 and to a second active position wherein the inlet and outlet ports 98 and 100 are respectively connected to the reservoir 108 and the pump 104.

The bores 86, 88, 90 and 92 are respectively intersected by right control ports 112, 114, 116 and 118 and by respective left control ports 120, 122, 124 and 126. The right control ports 112 and 118 are interconnected to each other and to a first work port 128 of the right actuator 46 by a fluid conduit means 130 and the right control ports 114 and 116 are interconnected to each other and to a second work port 132 of the right actuator 46 by a conduit means 134. Similarly, the left control ports 120 and 126 are interconnected to each other and to a first work port 136 of the left actuator 48 by a fluid conduit means 138 and the left control ports 122 and 124 are interconnected to each other and to a second work port 140 of the left actuator 48 by a conduit means 142.

The right and left control ports are respectively selectively connected or disconnected via the medial portions of the bores to either the inlet port 98 or the outlet port 100 by the operation of identical valve members 144 positioned in the opposite ends of each bore.

The valve members 144 each include an elongated sleeve-like member 146 having an outer end portion 148 threadedly received in the end of a bore and held in the desired axial position by a lock nut 150. The members 146 each have a central bore 152 intersected by radial ports 154, the bore 152 and the ports 154 forming a fluid passage for fluid communication between either the inlet or return ports 98 and 100 respectively, and the right and left groups of control ports. The inner end 156 of each of the members 146 terminates in a planar, annular valve seat 158 and a hollow valve element 160 is normally seated against the seat 158, as shown in the bores 90 and 92 of FIG. 4, to block flow to and from the bore 152. The valve elements 160 are unseated to the position shown in the bores 86 and 88 of FIG. 4 by valve stems 162 which are shiftably mounted in the central bores 152 of the members 146. The inner ends of the valve stems 162 terminate interiorly of the hollow valve elements 160 for abutting engagement with a plug 164 in the end of the valve element 160. A retaining ring 165 is secured to each of the valve stems 162 and engages annular shoulders 166 in the valve elements 160 to prevent the valve stems from being withdrawn from the valve elements. To ensure that the valve elements 160 will remain seated until positively unseated by shifting the valve stems 162 inwardly within the valve bores, the outer ends of the valve stems 162 are stepped up in diameter from the inner ends, and tapered portions 168 join the inner and outer ends and are of larger cross-sectional area than the retaining rings 164 at the inner ends of the valve stems 162 whereby fluid pressure in the bores 152 will act to shift the valve stems outwardly and engage the retaining rings 164 against the shoulders 166 of the valve elements 160 to seat the valve elements against the seats 158. The plugs 164 are spaced axially from the shoulders 166 to permit the valve stems to be shifted slightly axially inwardly without effecting the valve element 160 for a purpose to be explained below.

Wedge-shaped cams 170 and 172 are respectively contiguous with the upper ends of and swivel with the mounting pin structures 62 and 64 during extension and retraction of the actuators 46 and 48 to automatically control, as will be more fully explained below, the positions of the valve stems 162 to reverse the flow of fluid to the actuators 46 and 48 when they reach the ends of their strokes.

Figure 4:
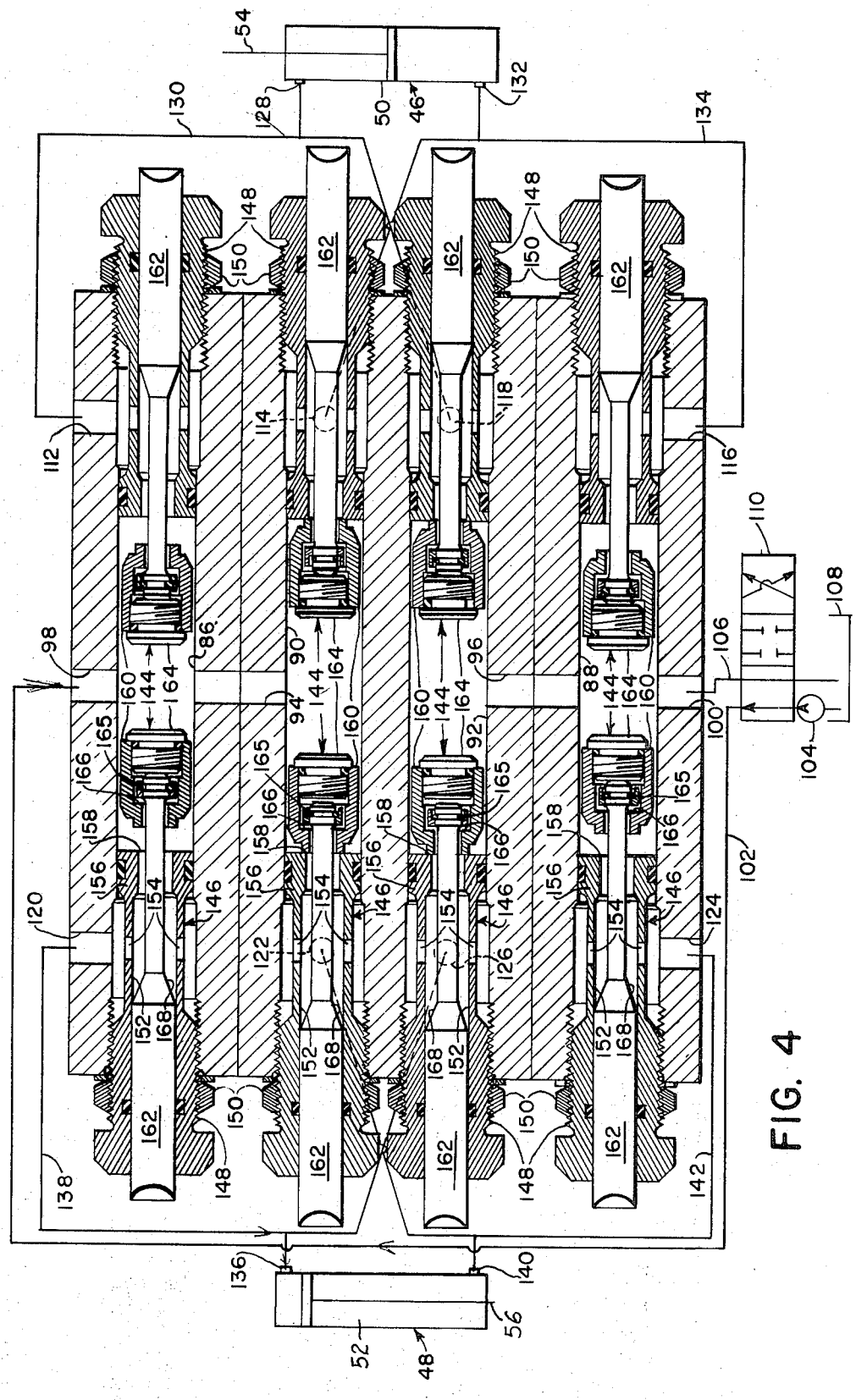
FIG. 4 is a schematic view of the fluid system for controlling the power transmission device, showing the reversing valve in section with the valve bores in a common plane for convenience and showing the system in the condition for driving the grader circle counterclockwise.

The operation of the power transmission device 42 is initiated by shifting the direction control valve 110 from its central neutral position to one or the other of the active conditions. As will become apparent from the description below, connection of the inlet 98 to the pump 104, as illustrated in FIG. 4, will result in counterclockwise rotation of the crank shaft 70 and the grader circle while connection of the inlet 98 to the reservoir 108 will result in clockwise rotation of the circle 40. Since the operation is essentially the same for either direction of rotation, only the operation for counterclockwise rotation is discussed and all directions of rotation mentioned below are with reference to the circle 40 being driven counterclockwise.

Thus, with the inlet 98 and the outlet 100 respectively connected to the pump 104 and the reservoir 108, as illustrated in FIG. 4, pressurized fluid is admitted to the upper pair of valve bores 86 and 90 between the valve stems 162 and the portions of the lower pair of valve bores 88 and 92 between the valve stems 162 are connected to exhaust to the reservoir 108. The positions of the valve stems 162, hence, the valve elements 160, determine the paths of fluid communication between the valve bores and the work ports of the actuators 46 and 48, and the positions of the actuators 46 and 48, through means of the cams 170 and 172 on the actuator mounting pin structures 62 and 64, in turn determine the positions of the valve stems 162. For example, when the actuators 46 and 48 are in the positions illustrated in FIG. 2, the piston rod 54 of the actuator 46 is halfway retracted and the cam 170 on the pin structure 62 is at an extreme counterclockwise position wherein it holds the valve stems 162 in the right ends of the pair of valve bores 86 and 88 forwardly of the line B—B, shifted to retain the valve elements 160 in an unseated condition. Pressurized fluid in the valve bore 86 is thus permitted to flow around the valve element 160, into the bore 152 and out through the radial ports 154 to the control port 112 and from there to the work port 128 of the actuator 46 via conduit means 130. Simultaneously, pressurized fluid in the actuator 46 is permitted to exhaust from the work port 132, through the conduit means 134 to the control port 116 of the valve bore 88 then into the bore 152 via the radial ports 154 and out the end of the bore 152 and around the valve element 160 to the central portion of the valve bore 88. It can be seen then that the actuator 46 is actuated to continue its retraction stroke. The actuator 46 on the other hand is 90° out of phase with respect to the actuator 46 and is fully retracted. It is at the fully retracted and fully extended positions of the actuators that the cam surfaces switch from holding shifted the pair of valve stems, on one side of the line B—B to holding shifted the pair of valve stems on the other side of the line B—B and in this case the cam surface 172 is at an intermediate position wherein it has just released the valve stems 162 in the pair of valve bores 90 and 92 rearwardly of the line B—B and has not yet shifted the valve stems 162 in the pair of valve bores 82 and 88 forwardly of the line B—B. The valve elements 160 in the valve bores 90 and 92 thus remain against their seats 158 and fluid flow is blocked to and from the actuator 48. As the actuator 46 continues its retraction stroke, the actuator 48, through its connection with the crank pin 72, is rotated off-center far enough clockwise for the cam surface 172 to shift the valve stems 162 in the pair of bores 86 and 88 against the plugs 164 of the valve elements 160. On extending actuator 48, pressure fluid from the pump 104 will then flow to the actuator work port 136 via the port 98, bore 86, control port 120 and conduit means 138 while exhaust fluid will simultaneously flow from the actuator work port 140 to the reservoir 108 via the conduit means 142, the control port 124, the bore 88 and the port 100. The reversing valve 82 is then in the condition illustrated in FIG. 4.

When the actuator 46 is fully retracted, the cam 170 will be at its intermediate position wherein it has just released the pair of valve stems 162 in the pair of valve bores 86 and 88 forwardly of the line B—B and has not yet shifted the valve stems 162 in the pair of valve bores 90 and 92 rearwardly of the line B—B. This time the actuator 48, as it further extends, rotates the actuator 46 clockwise enough for the cam surface 170 to shift the valve stems 162 in the rearward pair of valve bores 90 and 92. The work ports 128 and 132 are then connected respectively to exhaust and to fluid pressure through the bores 90 and 92.

The cam surfaces 170 and 172 act similarly to reverse the flow of fluid to the work ports of the actuators 46 and 48 when the actuators reach their fully extended positions 180° from their fully retracted positions.

To insure that the actuators 46 and 48 are over-center before being actuated to move from their fully extended or fully retracted positions, the lost-motion connections between the valve elements 160 and the valve stems 162 permit the valve stems to be shifted a limited axial distance before contacting the plug 164 to unseat the valve elements 160.

Also, it is to be noted that even though fluid pressure may exist in the bores 152, the valve elements 160 will remain seated until the valve stems 162 are positively shifted by the cams 170 and 172 due to the cross-sectional area of the ramp 168 exposed to the pressure in the bore 152.

I claim:

1. A hydraulic fluid system comprising: a source of fluid pressure; a fluid reservoir; first and second extensible and retractable hydraulic actuators; each of said actuators having at least one work port; valve bore means including at least a first pair of separate bore sections; one of said bore sections having a fluid inlet connected to the source of fluid pressure and the other of said bore sections having a fluid outlet connected to the reservoir; said one bore section having first and second control ports spaced axially from and respectively located at the opposite sides of said inlet; said other bore section having third and fourth control ports spaced axially from and respectively located at the opposite sides of said outlet; first fluid passage means interconnecting said first and third control ports and the one work port of the first actuator and second fluid passage means interconnecting said second and fourth control ports and the one work port of the second actuator; first and second valve means being in said one bore section respectively between the inlet and the first control port and between the inlet and the second control port; third and fourth valve means being in said other bore section respectively between the outlet and the third control port and between the outlet and the fourth control port; and said first, second, third and fourth valve means being selectively operable for connecting the one work port of each of said first and second actuators either to the source of fluid pressure or to the reservoir.

2. A hydraulic fluid system comprising: a source of fluid pressure; a fluid reservoir, first and second double-acting extensible and retractable hydraulic actuators; valve bore means including first, second, third and fourth separate bore sections; said first and second bore sections each having a fluid inlet connected to said source of fluid pressure and having a pair of control ports spaced axially from and respectively located at opposite sides of the inlet; said third and fourth bore sections each having a fluid outlet connected to said reservoir and having a pair of control ports spaced axially from and located at opposite sides of the outlet; a first fluid passage means interconnecting one control port of each of the first and third bore sections and one work port of the first actuator; a second fluid passage means interconnecting one control port of each of the second and fourth bore sections and the other work port of the first actuator; a third fluid passage means interconnecting the other control port of each of the first and third bore sections and the one work port of the second actuator; a fourth fluid passage means interconnecting the other control port of each of the second and fourth bore sections and the other work port of the second actuator; each of said first and second bore sections containing a pair of valve means respectively located between the inlet and the pair of control ports at the opposite sides of the inlet; each of said third and fourth bore sections containing a pair of valve means respectively located between the outlet and the pair of control ports at the opposite sides of the outlet; and each of said valve means being selectively operable for establishing conditions wherein one of the work ports of each of the actuators is connected to the source of fluid pressure while the remaining work port of each of the actuators is connected to the reservoir.

3. A hydraulic fluid system comprising: a source of fluid pressure; a fluid reservoir; an extensible and retractable hydraulic actuator having at least one work port; valve bore means including at least a first pair of separate bore sections, one of said bore sections having a fluid inlet connected to the source of fluid pressure and the other of said bore sections having a fluid outlet connected to the reservoir; said one and other bore sections respectively having first and second control ports spaced axially from said fluid inlet and said fluid outlet, fluid passage means interconnecting said first and second control ports and said one work port; and first and second valve means respectively in said one valve bore section between the fluid inlet and the first control port and in the other valve bore section between the fluid outlet and the second control port, said first and second valve means each including an annular member fixed in the associated bore section, each annular member including an annular seat disposed about an axial opening, a valve stem having an inner end reciprocably and loosely received in the axial opening of said annular member and a valve element mounted on the inner end of each valve stem by means permitting axial lost-motion movement of the valve stems relative to the valve elements and the valve elements each having an annular surface positioned for selective engagement with the annular seat of the associated annular member for blocking the axial opening; and said valve stems being selectively operable for connecting the work port either to the source of fluid pressure or to the reservoir.

4. A hydraulic fluid system comprising: a source of fluid pressure; a fluid reservoir; an extensible and retractable hydraulic actuator having at least one work port; valve bore means including first and second separate side-by-side valve bores respectively having parallel longitudinal axes; said first and second valve bores respectively having a fluid inlet and a fluid outlet respectively connected to said source and reservoir; said first and second valve bores each having a control port respectively spaced axially from said fluid inlet and fluid outlet; said first and second valve bores each containing a valve means located respectively between the fluid inlet and the control port of the first valve bore and between the fluid outlet and the control port of the second valve bore; fluid passage means exclusive of said valve means interconnecting said control ports with each other and with said actuator work port; each of said valve means including an axially shiftable valve member movable between open and closed positions for permitting or interrupting flow to and from the associated control port, the valve member in the first bore moving in the direction of flow from the inlet to the control port when being shifted to its closed position and the valve member in the second bore moving opposite to the direction of flow from the control port to the outlet when being shifted to its closed position whereby the roles of the inlet and the outlet may be interchanged without affecting the operation of the system other than for a reversal of the flow of fluid therethrough; and said valve means being selectively operable for establishing a first condition wherein the work port is connected to said source and blocked from said reservoir and a second condition wherein the work port is connected to said reservoir and blocked from said source.

5. A hydraulic fluid system, comprising: a source of fluid pressure; a fluid reservoir; an extensible and retractable hydraulic actuator having first and second ports; valve bore means including first, second, third and fourth separate side-by-side valve bores; said first and third bores each having an inlet connected to the source of fluid pressure and a control port spaced axially from the inlet, said first and third bores each containing a valve means located between the inlet and control port; said second and fourth bores each having an outlet connected to the reservoir and a control port spaced axially from the outlet, said second and fourth bores each containing a valve means located between the outlet and the control port; a first fluid passage means exclusive of said valve means interconnecting the respective control ports of the first and second bores with each other and with the first work port and a second fluid passage means exclusive of said valve means interconnecting the respective control ports of the third and fourth bores with each other and with the second work port; and said valve means being selectively operable for establishing a first condition wherein the source is connected to the first work port while the second work port is connected to the reservoir and a second condition wherein the source is connected to the second work port while the first work port is connected to the reservoir.

6. A hydraulic fluid system comprising: a source of fluid pressure; a fluid reservoir; an extensible and retractable hydraulic actuator having at least one work port; valve bore means including at least a first pair of separate bore sections, one of said bore sections having a fluid inlet connected to said source and the other of said bore sections having a fluid outlet connected to said reservoir; said one and other bore sections respectively having first and second control ports spaced axially from said fluid inlet and from said fluid outlet; fluid passage means interconnecting said control ports with each other and with said work port; said one bore section containing a first valve means between said inlet and first control port and said other bore section containing a second valve means between said outlet and second control port; said first valve means being operable between open and closed positions wherein the fluid passage means is respectively connected to and blocked from said source and said second valve means being similarly operable between open and closed positions wherein the fluid passage means is respectively connected to and blocked from said reservoir and said first and second valve means being configured and disposed such that fluid pressure acting on said first valve means is always in a direction tending to close the latter while fluid pressure acting on the second valve means is in a direction tending to close the second valve means when the latter is closed and tending to open the second valve means when the latter is open.

7. The invention defined in claim 6 wherein each of said valve means includes an annular member fixed in the associated bore, each annular member including an annular seal disposed about an axial opening, a valve stem having an inner end portion loosely received in the axial opening of each annular member; a valve member carried on the inner end of each valve stem and having an annular surface positioned for selective engagement with the annu-lar seat of the associated annular member for establishing the closed positions of the valve means and said valve stems each having an outer end stepped up in diameter from the inner end, the cross-sectional area of the step portion being such that pressure in the associated bore between the annular member and control port will tend to urge the valve stem outwardly whereby the valve element on the inner end of the valve stem will be urged into seating engagement with the annular member.

* * * * *